(12) United States Patent
Behling

(10) Patent No.: US 6,463,643 B1
(45) Date of Patent: Oct. 15, 2002

(54) APPARATUS FOR WITHDRAWING A SCREW FROM THE BARREL OF A SCREW EXTRUDER

(75) Inventor: Michael Behling, Hamein (DE)

(73) Assignee: Berstorff GmbH, Hannover (DE)

( * ) Notice: Subject to any disclaimer, the term of this patent is extended or adjusted under 35 U.S.C. 154(b) by 0 days.

(21) Appl. No.: 09/664,255

(22) Filed: Sep. 18, 2000

(30) Foreign Application Priority Data

Sep. 24, 1999 (DE) .......................................... 199 47 439

(51) Int. Cl.⁷ ................................................. B23P 19/04
(52) U.S. Cl. .......................................... 29/252; 29/263
(58) Field of Search ................................ 269/259, 263, 269/258, 260, 252; 279/42, 41, 51, 46, 48, 50, 52, 56, 57

(56) References Cited

U.S. PATENT DOCUMENTS

| | | | | |
|---|---|---|---|---|
| 3,972,103 A | * | 8/1976 | Kenyon ........................ | 29/263 |
| 4,021,903 A | * | 5/1977 | Walsh ........................ | 29/263 |
| 4,059,883 A | * | 11/1977 | Osborne ........................ | 29/259 |
| 5,890,271 A | * | 4/1999 | Bromley et al. ............... | 29/263 |

FOREIGN PATENT DOCUMENTS

DE 195 04 119 A1 8/1996

* cited by examiner

*Primary Examiner*—Robert C. Watson
(74) *Attorney, Agent, or Firm*—Henry M. Feiereisen

(57) ABSTRACT

Apparatus for withdrawing at least one screw from the barrel of a screw extruder in conveying direction of the screw extruder, with the screw defining a longitudinal axis and terminating in a screw cap, includes at least one gripper having a free end for attachment of a pull mechanism and a grabbing end for interaction with an undercut of the screw cap. The grabbing end is formed with a plurality of radially resilient clamping segments for formation of a hollow cylinder having an inner diameter, which substantially corresponds to an outer diameter of the screw cap, and an outer diameter which is smaller than a diameter of a bore of the barrel. Each resilient clamping segment terminates in a beaded end which extends radially into the hollow cylinder for formation of a claw, wherein the beaded end has a wall thickness which is smaller than a difference between a radius of the barrel bore and an outer radius of the screw cap, and, in longitudinal direction of the gripper, a length which is smaller than a width of the undercut of the screw cap in longitudinal direction of the screw.

33 Claims, 3 Drawing Sheets

APPARATUS FOR WITHDRAWING A SCREW FROM THE BARREL OF A SCREW EXTRUDER

CROSS-REFERENCES TO RELATED APPLICATIONS

This application claims the priority of German Patent Application, Serial No. 199 47 439.7, filed Sep. 24, 1999, the subject matter of which is incorporated herein by reference.

BACKGROUND OF THE INVENTION

The present invention relates to an apparatus for withdrawing a screw from the barrel of a screw extruder.

Typically, a screw extruder has a barrel which defines a bore for receiving a screw. During operation, the screw rotates in the barrel bore to convey a medium, and has a head portion, called screw cap, which is formed with an outwardly pointing undercut. In general, the screw of a single screw extruder or the screws of a multi-screw extruder have a geometric shape that is best suited to the particular properties of a material or material group that is processed in the extruder. As a consequence, each time when the extruder is intended for use with a different material of markedly different properties, the screw must be replaced for a different type to ensure optimum operating conditions. Normally, the screw exchange is carried out in such a manner that the screw is extracted in conveying direction, i.e. the screw is withdrawn at the head portion of the extruder from the barrel bore. Oftentimes, the screw is composed of a plurality of components which are arranged axially behind one another and formed with a longitudinal bore for passage of a shaft. Threadably mounted onto the shaft is the screw cap which forms a closing element in conveying direction and braces the individual components of the screw together. The screw cap thus forms the head portion of the screw. As substantial forces must be applied, especially when extruders of larger size are involved, in order to extract the screw from the barrel bore, particular pull mechanisms, such as chain tackles or hydraulic cylinders, have frequently been used for attachment to the head portion. Normally, the head portion is provided with a circumferential groove in the form of an outwardly facing undercut for positive engagement of gripper claws of an extractor device, and a post-processing device, such as a screen pack changer, a die plate of a granulating machine, slot die or other nozzle for producing extrudate, is operatively connected to the head portion of the extruder. As a consequence of the comparably robust configuration of the gripper claws, conventional extraction apparatus require a dismantling of the post-processing device before a screw replacement can take place so as to create the needed space for attachment of the extraction apparatus. Dismantling and alterations are fairly cumbersome and increase the manufacturing costs, in particular when smaller batches of different material are processed as a screw replacement is needed within shorter intervals compared to larger batches that run at respectively longer operating periods, without requiring a screw replacement.

SUMMARY OF THE INVENTION

It is thus an object of the present invention to provide an improved screw extraction apparatus, obviating the aforestated drawbacks.

In particular, it is an object of the present invention to provide an improved screw extraction apparatus which is simple in structure and yet is capable to significantly reduce the complexity of replacing a screw of a screw extruder.

These objects, and others which will become apparent hereinafter, are attained in accordance with the present invention by providing at least one gripper having a free end for attachment of a pull mechanism and a grabbing end for interaction with an undercut of the screw cap, with the at least one gripper being formed at grabbing end with a plurality of radially resilient clamping segments which can be elastically bent inwards and/or outwards, and which form parts of a hollow cylinder in longitudinal direction thereof, whereby the hollow cylinder has an inner diameter, which substantially corresponds to an outer diameter of the screw cap, and an outer diameter which is smaller than a diameter of a bore of the barrel, wherein each of the clamping segments terminates in a beaded end which extends radially into the hollow cylinder for formation of a gripping claw, with the beaded end having a wall thickness which is smaller than a difference between a radius of the barrel bore and an outer radius of the screw cap, and, in longitudinal direction of the gripper, a length which is smaller than a width of the undercut of the screw cap in longitudinal direction of the screw.

The novel and inventive approach of the present invention is based on the recognition that the complexity of a screw replacement can be substantially reduced when a dismantling of post-processing devices, positioned downstream of the extruder head, can be eliminated. To date, conventional extraction apparatuses did not allow this approach because, without dismantling of the post-processing device, there was simply not enough space available to attach the extraction apparatus. This problem has now been overcome through the provision of an extraction apparatus according to the present invention, which exhibits a very slim and extremely space-saving configuration of its gripper tools.

Through the provision of a gripper with radially resilient clamping segments in accordance with the present invention, the gripper end can be inserted into the barrel bore and pushed over the screw cap, whereas the beaded ends of the clamping segments are so configured in size and shape as to form gripping claws which are prevented from wedging in the ring gap between the screw cap and the barrel bore. When the gripper end is pushed sufficiently far over the screw cap, the beaded ends can positively engage or snap in the undercut. Depending on the magnitude of the pulling forces applied in axial direction by means of a pull mechanism, such as a hydraulic cylinder, attached to the extraction apparatus, and the magnitude of the spring force exerted by the clamping segments, the positive engagement of the beaded ends in the undercut may be enough by itself in some cases to allow a withdrawal of the screw from the barrel bore. However, normally, it may be more advantageous to provide the gripper with a securing sleeve by which an inadvertent outward deflection of the clamping segments and thus a release of the positive engagement are prevented when axial forces are applied to extract the screw. The securing sleeve is suitably shiftable over the gripper up to the area of the clamping segments to thereby prevent the outward deflection of the clamping segments. Suitably, the securing sleeve has an inner diameter, which corresponds to the outer diameter of the hollow cylinder so as to be easily slideable over the hollow cylinder, and an outer diameter, which is smaller than the inner diameter of the barrel bore so that the securing sleeve can easily be pushed into the barrel with accommodated screw.

Suitably, the gripper has, as an essential component, a tubular portion, whereby the clamping segments are formed by a plurality of slits extending in axial direction from the grabbing end inwardly of the tubular portion. The beaded ends may be formed by selecting for the grabbing end a tubular portion with excess wall thickness, and subsequently turning the wall thickness from the inside to size, except in the area that should form the beaded ends. Of course, there is no need to reduce the wall thickness across the entire length of the tubular portion. It is sufficient to turn the wall thickness of the tubular portion to size along a section that is long enough to allow the inner surface of the tubular portion to contact the screw cap. Suitably, the turned section extends slightly beyond the length of the clamping segments so that the clamping segments have a smaller wall thickness than the rest of the tubular portion.

To facilitate a detachment of the screw extraction apparatus, after withdrawal of the screw and release of the clamping segments through retraction of the securing sleeve, i.e. to allow a fairly easy outward deflection of the clamping segments when applying axial pulling forces, it is proposed to provide the gripper on the inside with a circumferential bevel at the clamping segments in a transitional area between the wall thickness of the hollow cylinder and the beaded end. In this way, the applied pulling forces automatically generate radially outwardly acting deflection forces to outwardly deflect and open the clamping segments as a consequence of the wedge effect of the bevel.

Of course, it may be suitable to so configure the clamping segments in a rest position or disengaged state as to slightly bend up radially outwards so that the inner diameter of the gripper approximately corresponds in the area of the beaded ends to the outer diameter of the screw cap or even slightly exceeds the outer diameter of the screw cap in which case the extraction apparatus can be detached after disengagement of the clamping segments directly from the screw cap, without a need to apply a particular force. In order for the clamping segments to seize in this case the screw cap, once the extraction apparatus is attached, and thus to realize the positive engagement of the beaded ends in the undercut of the screw cap, the required radially inward deflection of the clamping segments is effected by the securing sleeve when pushed over the clamping segments.

The screw extraction apparatus according to the present invention is particularly useful for withdrawing a screw of a twin screw extruder. Accordingly, the extraction apparatus has two grippers having longitudinal axes extending in side-by-side parallel disposition at a distance which corresponds to a distance of the two screws. Both grippers are braced together by a connecting member for retaining their relative alignment. Although it may certainly be possible to use two grippers which are configured completely separate from one another, the use of a twin aggregate with interconnected grippers is preferred. The connecting member for bracing the two grippers may be comprised of two tie rods and a first yoke, with the tie rods and the yoke being joined together by bolting or welding. As the use of securing sleeves is also preferred in this case, these securing sleeves are each formed by a tubular portion and joined together by a second yoke so as to establish a common movement. Of course, it is certainly possible to omit such an interconnection of the securing sleeves altogether and to move the securing sleeves in succession to their respective locking position.

Suitably, the second yoke may have throughholes for the tie rods of the first yoke to thereby establish a displacement of the securing sleeves in a precise parallel relationship. The first yoke for interconnecting the two grippers may be connected to an eyelet for easier attachment of the pull mechanism. The eyelet may be secured to a threaded rod received in a threaded bore of the first yoke and extending to the second yoke, with the threaded rod being connected to the second yoke in such a manner that the threaded rod can turn in the second yoke but is immobile in an axial direction relative to the second yoke. In this way, a turning of the eyelet is translated into a threading of the threaded rod through the first yoke to thereby effect a respective longitudinal displacement of the securing sleeves relative to the gripper. Thus, a manual operation of the extraction apparatus can be carried out effortlessly to implement a locking and unlocking of the grippers.

Suitably, the gripper is made of a metal, preferably steel so as to be able to withstand comparably high loads with the required small wall thickness of the extraction apparatus. Of course, some or all components can also be made from other suitable materials, such as fiber composites (e.g. carbon fibers).

Through the provision of a screw extraction apparatus according to the present invention, a screw replacement can be carried out, without requiring a time-consuming and complicated dismantling of post-processing devices that are attached to the extruder head. For example, in case of a screen pack changer as post-processing device, there exists a situation between the operational states of both screen elements in which the screw cap of the extruder screw is accessible from outside. In this position, the extraction apparatus according to the present invention can reach the screw cap through the screen pack changer and, after engagement of the clamping segments in the undercut of the screw cap and, optionally, locking of the clamping segments by the securing sleeve, the screw can be withdrawn from the barrel bore of the extruder through the screen pack changer. The same is true in the event the extruder head is connected to an extrusion die. When, for example, the nozzle head is guided by a rail system for displacement in a longitudinal direction, transversely to the extrusion direction, upon an intermediate plate which is securely fixed to the extruder, as described, for example, in German Pat. No. DE 195 04 119 A1, the nozzle head can be quickly released and easily pushed aside so that the screw cap of the extruder screw becomes again accessible from outside. Due to the fact that the intermediate plate remains securely fixed to the extruder, the available free working space is still be too small for attachment of conventional extraction apparatuses so that a dismantling of the intermediate plate would be needed. This, however, is not necessary when using an extraction apparatus according to the present invention, as the novel and inventive extraction apparatus can reach through the extrusion space of the intermediate plate to the screw head so that the extruder screw can be extracted to the outside through the intermediate plate.

A screw extraction apparatus according to the present invention can be fabricated in a comparably simple manner and is easy to operate. As a consequence of the small wall thickness of the gripper and the securing sleeves, the outer dimensions only slightly exceed the dimensions of the extruder screw. Yet, the extraction apparatus is very robust and capable to absorb great forces, without risking an inadvertent opening of the locked connection between the screw caps and the grippers.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
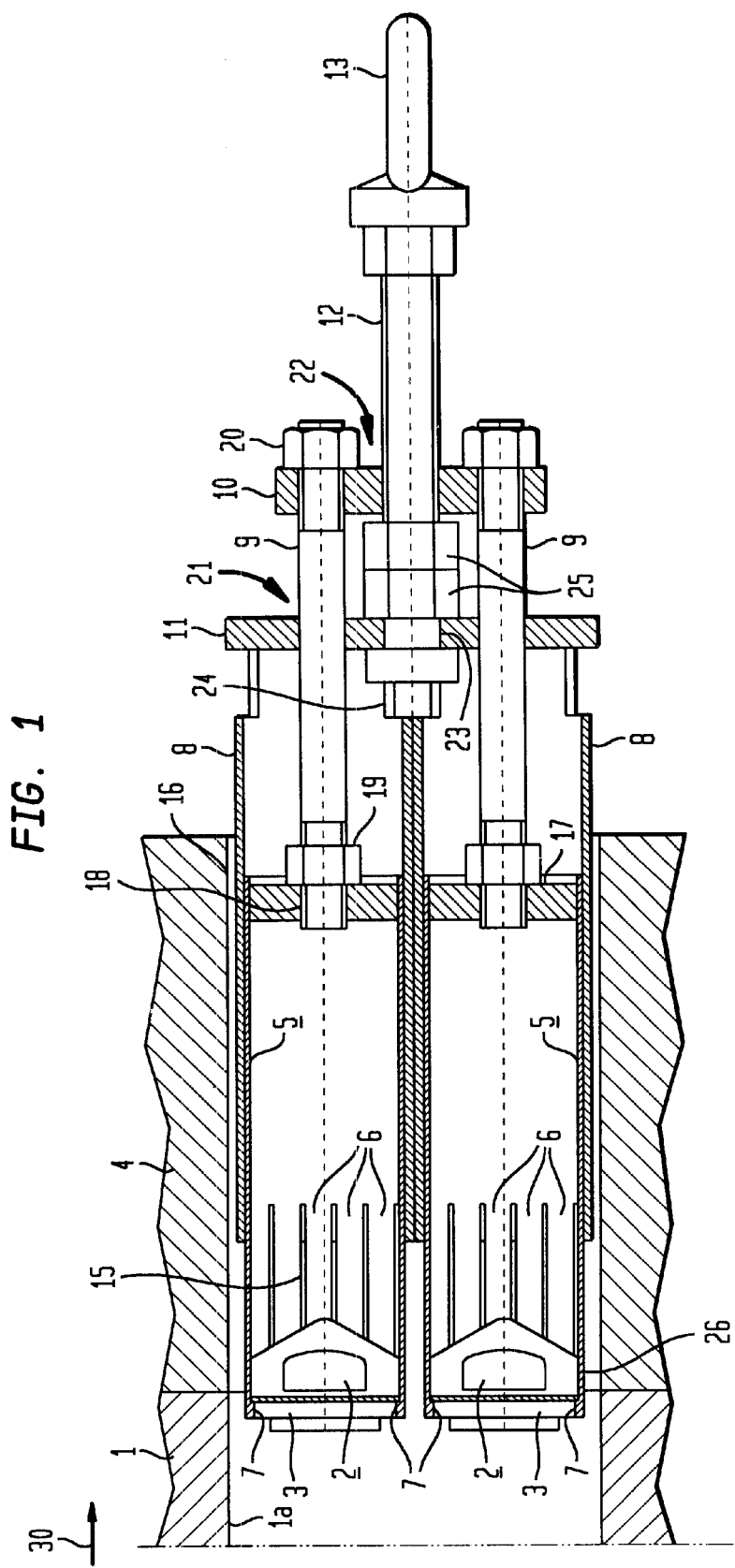
FIG. 1 is a sectional view of a screw extraction apparatus according to the present invention, illustrating a securing sleeve in an intermediate position.

Throughout all the Figures, same or corresponding elements are generally indicated by same reference numerals.

Turning now to the drawing, and in particular to FIG. 1, there is shown a sectional view of a screw extraction apparatus according to the present invention. By way of example, the extraction apparatus is designed for withdrawing screws of a twin screw extruder. Persons skilled in the art will appreciate, however, that the principles described in the following description are equally applicable to other types of screw extruders as well. The twin screw extruder has a barrel 1, which is shown here only by way of the exit end and has a bore 1a. The bore 1a of the barrel 1 accommodates two screws, shown here only in dash-dot lines by way of their head portions in the form of screw caps 2 which are threadably mounted on a screw shaft (not shown). Material is conveyed by the twin screw extruder in a conveying direction from left to right in FIG. 1, as indicated by arrow 30. A post-processing unit, e.g., in the form of a screen pack changer 4 is threadably mounted to the extruder head to receive extruded material for further processing. Unlike conventional extraction apparatuses that require a dismantling of the processing unit 4 to provide needed space for reaching the screw caps 2, the extraction apparatus according to the present invention is configured to reach the screw caps 2 through the screen pack changer 4 and includes two grippers 5 placed in parallel disposition and spaced from one another at a distance which corresponds to the distance between the two screws. As the grippers 5 are of an identical construction, the following description will refer to only one of the grippers. However, it will be understood by persons skilled in the art that a description of one of the grippers 5 is equally applicable to the other one of the grippers 5.

Figure 2:
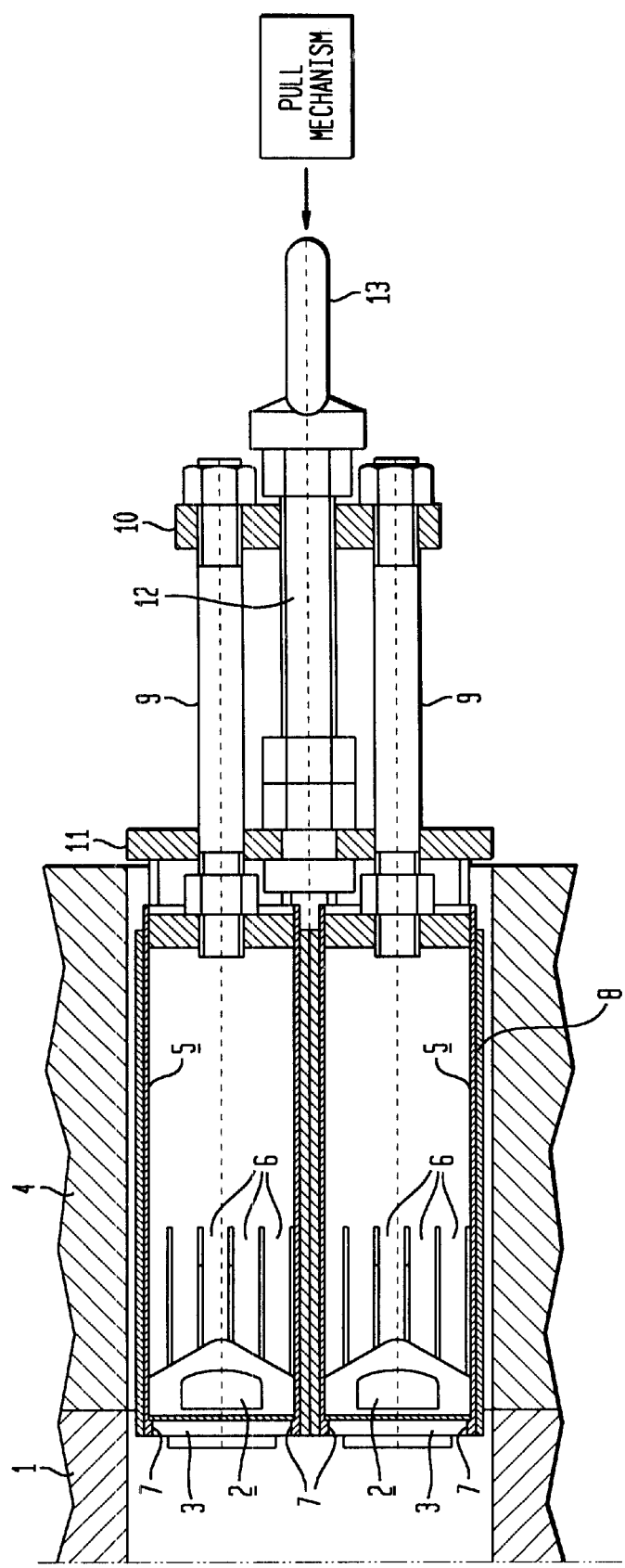
FIG. 2 is a sectional view of the screw extraction apparatus of FIG. 1 in locking position.

Each of the grippers 5 is of hollow cylindrical configuration and formed by a tubular portion of metal, e.g. steel. The tubular portion terminates at the left hand side in a beaded end 7 to define the grabbing end. The beaded end 7 points radially inwards and can be formed by turning the inside of the tubular portion along a short section to size. The tubular portion of the gripper 5 has a plurality of axial slits 15 extending evenly over the circumference from the barrel proximal end inwardly over about 40% to 50% of the axial length of the tubular portion to form a plurality of radially resilient tongue-shaped clamping segments 6 which define a hollow cylinder. The slits 15 extend through the entire wall thickness of the tubular portion so that the clamping segments 6 can deflect elastically to the outside. The clamping segments 6 terminate in beaded ends 7, which have each an axial length corresponding to the axial width of an undercut 3 formed on each of the screw caps 2, for positive engagement of the beaded ends 7 in the undercut 3, when the extraction apparatus is placed from the right through the throughbore 16 of the screen pack changer 4, as shown in FIGS. 1 and 2, and attachment onto the screw caps 2. The entire wall thickness of each beaded end 7 is smaller than the difference between the radius of the barrel bore 1a and the outer radius of the screw cap 2.

The spring force of the individual clamping segments 6 depends, on the one hand, on the strength properties of the material being used for the gripper 5, suitably, metal, preferably steel, which material is also used for cost efficiency. On the other hand, the spring force of the clamping segments 6 is determined by the selected wall thickness of the gripper 5 and the length of the clamping segments 6. The longer the clamping segments 6, the lower their spring force.

The hollow cylinder formed by the clamping segments 6 is defined by an inner diameter, which substantially corresponds to the outer diameter of the screw cap 2, and by an outer diameter, which is smaller than the diameter of the bore 1a of the barrel 1.

At its beaded end distal side, each gripper 5 is closed by a thick-walled terminal disk 17 which is provided with a central bore 18 for threaded engagement of a tie rod 9. A locknut 19 secures the tie rod 9 in place. The opposite disk-distal end of each tie rod 9 is provided with an internal thread for threaded engagement in a yoke 10 in the form of a thick-walled connection plate, whereby the threaded engagement is secured by a locknut 20. In this manner, the yoke 10 forms together with both tie rods 9 and both grippers 5 an interconnected structural unit.

Each of the grippers 5 is encircled on the outside by a tubular securing sleeve 8 which is placed over and slideable along the tubular portion of the gripper 5. Both securing sleeves 8 are rigidly connected together by a yoke 11 to form a structural unit. The yoke 11 has two bores 21 for sliding passage of the tie rods 9. Thus, each securing sleeve 8 can be shifted to the left along the gripper 5 to the area of the clamping segments 6 by means of pressure forces applied in axial direction. This position is shown in FIG. 2 and illustrates that the securing sleeve 8 prevents an outward deflection of the clamping segments 6, so that the beaded ends 7 not only engage in the undercut 3 but are also locked in place by the securing sleeve 8, thereby realizing an absolutely positive connection between the screw cap 2 and the gripper 5.

Suitably, the securing sleeve 8 has an inner diameter, which corresponds to the outer diameter of the hollow cylinder formed by the clamping segments 6, and an outer diameter, which is smaller than the barrel bore 1a.

By applying pulling forces on the grippers 5 or the yoke 10 in the conveying direction 30 of the extruder toward the right in FIG. 1, both screws of the twin screw extruder can be extracted simultaneously out of the bore 1a of the barrel 1. The pulling forces are produced by a pull mechanism, e.g. a hydraulic cylinder, which is attached to an eyelet 13, shown in particular in FIG. 3. The eyelet 13 may be rigidly connected directly to the yoke 10, or, as shown in the drawing, threadably engaged on the free end of a threaded rod 12 which is guided through a central bore 22 of the yoke 10 and passes through a bore 23 of the yoke 11. The other opposite end of the threaded rod 12 includes a head portion 24 which rests against the confronting (left) side of the yoke 11. The threaded rod 12 is secured against displacement in longitudinal direction by two locknuts 25 but allowed to conjointly rotate with the yoke 11. In this way, pressure forces for shifting the securing sleeves 8 to the area of the clamping segments 6 can be transmitted to the securing sleeves 8 through turning the eyelet 13 as a consequence of a screw motion of the threaded rod 12. Hereby, the threaded rod 12 is shifted longitudinally relative to the yoke 10.

To allow an easy outward deflection of the clamping segments 6 when applying axial pulling forces, the gripper 5 is formed on the inside with a circumferential bevel 26 in a transitional area between the clamping segments 6 and the beaded ends 7. In this way, the applied pulling forces automatically generate radially outwardly acting deflection forces for opening of the clamping segments 6 as a consequence of the wedge effect of the bevel 26.

Figure 3:
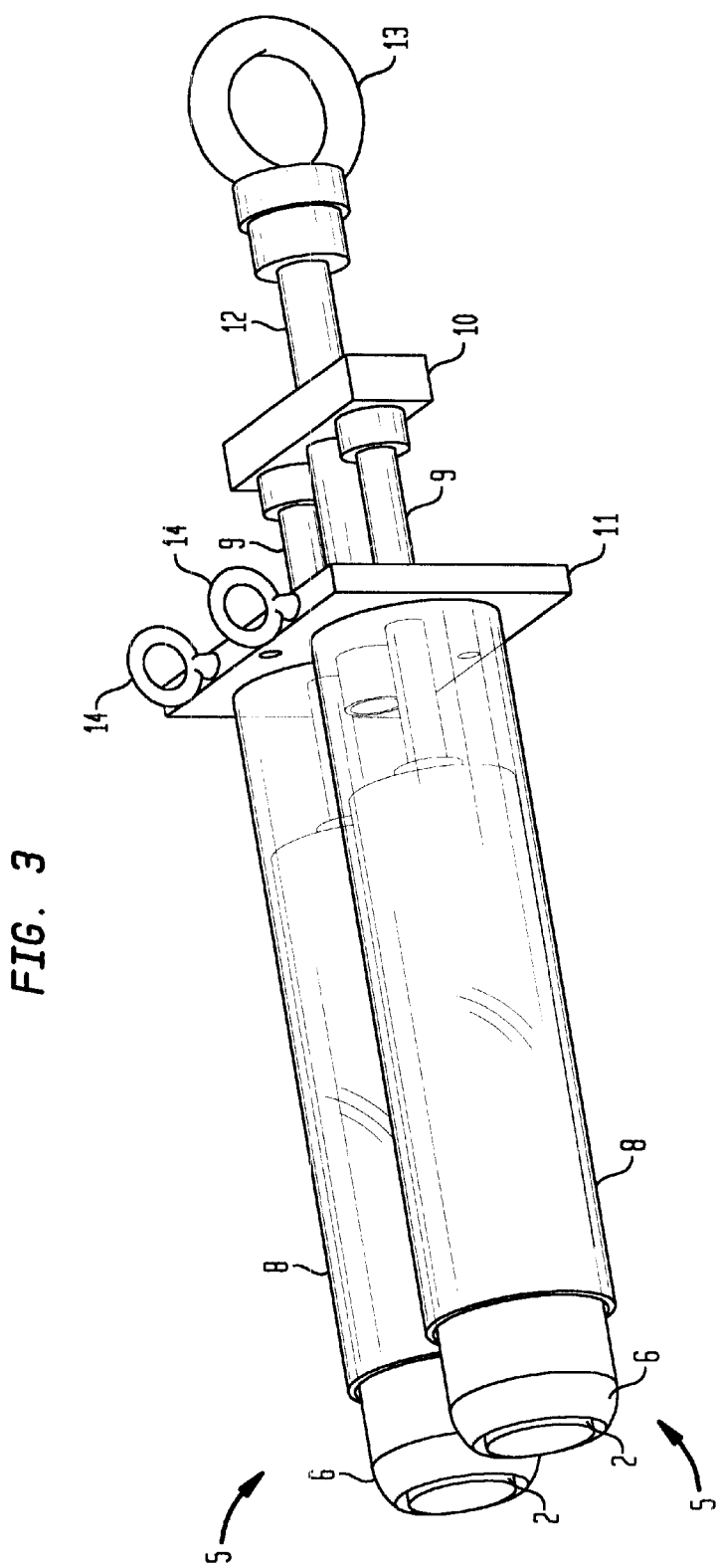
FIG. 3 is a perspective illustration of the extraction apparatus of FIG. 1, with the securing sleeve in the intermediate position.

FIG. 3 shows a perspective illustration of the extraction apparatus whereby both securing sleeves are shown transparent by lines in a position relative to the grippers 5 between locking and unlocking positions. Parts corresponding with those in FIG. 1 are denoted by identical reference numerals and not explained again. The yoke 11 is provided with two eyelets 14 to facilitate a horizontal alignment of the extraction apparatus by, for example, latching ropes of an assembly-hall crane.

While the invention has been illustrated and described as embodied in an apparatus for withdrawing a screw from the barrel of a screw extruder, it is not intended to be limited to the details shown since various modifications and structural changes may be made without departing in any way from the spirit of the present invention.

What is claimed as new and desired to be protected by Letters Patent is set forth in the appended claims:

1. Apparatus for withdrawing two screws from the barrel of a twin screw extruder in conveying direction of the screw extruder, with each of the screws defining a longitudinal axis and terminating in a screw cap, said apparatus comprising:

a pair of grippers, each of the grippers interacting with a corresponding one of the screws, whereby the grippers and the screws are placed into one-to-one correspondence, wherein the grippers are arranged in side-by-side parallel disposition at a distance, which corresponds to a distance of the two screws, and braced together by a connecting member for retaining their alignment, wherein each gripper has a free end for attachment of a pull mechanism and a grabbing end for interaction with an undercut of the screw cap, wherein each gripper is formed at the grabbing end with a plurality of clamping segments which are radially resilient with respect to the longitudinal axis so as to be elastically bendable inwards and/or outwards, and which form parts of a hollow cylinder in longitudinal direction thereof, with the hollow cylinder having an inner diameter, which substantially corresponds to an outer diameter of the screw cap, and an outer diameter which is smaller than a diameter of a bore of the barrel, wherein each of the clamping segments terminates in a beaded end which extends radially into the hollow cylinder for formation of a gripping claw, said beaded end having a wall thickness which is smaller than a difference between a radius of the barrel bore and an outer radius of the screw cap, and, in longitudinal direction of the gripper, a length which is smaller than a width of the undercut of the screw cap in longitudinal direction of the screw.

2. The apparatus of claim 1, and further comprising a securing sleeve which is movable over the at least one gripper up to an area of the clamping segments, said securing sleeve having an inner diameter, which corresponds to the outer diameter of the hollow cylinder, and an outer diameter, which is smaller than the barrel bore.

3. The apparatus of claim 1 wherein each gripper has a tubular portion, said clamping segments being formed by a plurality of slits extending in axial direction from the grabbing end inwardly over part of an axial length of the tubular portion.

4. The apparatus of claim 3 wherein the tubular portion has a wall thickness which is reduced, except for an area of the beaded ends, in the region of the clamping segments through turning the tubular portion on the inside thereof with respect to the remaining portion of the tubular portion.

5. The apparatus of claim 1 wherein each gripper is formed with a circumferential bevel inside of the clamping segments in a transitional area between the wall thickness of the hollow cylinder and the beaded end.

6. The apparatus of claim 1 wherein the connecting member includes two tie rods and a first yoke, said tie rods and said first yoke being joined together by bolting or welding.

7. The apparatus of claim 1, and further comprising two securing sleeves for the two grippers, with one of the securing sleeve interacting with one of the grippers and movable over the gripper up to an area of the clamping segments, and the other one of the securing sleeve interacting with the other one of the grippers and movable over the gripper up to an area of the clamping segments, said securing sleeves being formed each by a tubular portion and rigidly joined together by a second yoke.

8. The apparatus of claim 7 wherein the second yoke has throughholes for passage of the tie rods and is guided by the tie rods.

9. The apparatus of claim 7 wherein the first yoke is connected to an eyelet for attachment of the pull mechanism.

10. The apparatus of claim 9 wherein the first yoke has a central threaded bore, and further comprising a threaded rod received in the threaded bore and having a free end which is securely fixed to the eyelet, and another end which is adapted for rotating in the second yoke and restrained immobile in an axial direction relative to the second yoke.

11. The apparatus of claim 2 wherein each gripper is movable between a locking position in which the gripper seizes the screw and a disengaged position, said clamping segments being bent radially outwards when the gripper is in the disengaged position, with the gripper having, in an area of the beaded ends, an inner diameter which is slightly greater or slightly smaller than the outer diameter of the screw cap.

12. The apparatus of claim 1 wherein each gripper is made of metal.

13. The apparatus of claim 12 wherein each gripper is made of steel.

14. An extraction apparatus for withdrawing a pair of screws from the barrel of a screw extruder, comprising a pair of grippers, each of the grippers interacting with a corresponding one of the screws, whereby the grippers and the screws are placed into one-to-one correspondence, wherein the grippers are arranged in side-by-side parallel disposition at a distance, which corresponds to a distance of the two screws, and braced together by a connecting member for retaining their alignment, wherein the grippers are formed with a plurality of radially resilient clamping segments, each of which terminates in an inwardly projecting beaded end to form a gripping claw for engagement in an undercut in a head portion of the screws, said clamping segments defining a hollow cylinder having an inner diameter, which substantially corresponds to an outer diameter of the head portion of the screws, and an outer diameter which is smaller than a diameter of a barrel bore, said beaded end having a wall thickness which is smaller than a difference between a radius of the barrel bore and an outer radius of the head portion, and an axial length which is smaller than a width of the undercut in longitudinal direction of the screws.

15. The apparatus of claim 14, and further comprising a securing sleeve which is movable over the clamping segments to retain a positive engagement of the gripping claw in the undercut.

16. The apparatus of claim 14 wherein the clamping segments are formed by a plurality of slits extending in axial direction from an end face of the grippers inwardly over part of an axial length of the grippers.

17. The apparatus of claim 14 wherein the clamping segments are formed with a circumferential bevel in a transitional area between the hollow cylinder and the beaded end.

18. The apparatus of claim 14 wherein the grippers are made of metal.

19. The apparatus of claim 14 wherein the grippers are made of steel.

20. In combination:
  a screw extruder having a barrel and a screw defining a longitudinal axis and terminating in a screw cap; and
  an extraction apparatus for withdrawing the screw from the screw extruder in conveying direction of the screw extruder,
  wherein the extraction apparatus includes a gripper having a free end for attachment of a pull mechanism and a grabbing end for interaction with an undercut of the screw cap, said gripper formed at the grabbing end with a plurality of clamping segments which are radially resilient with respect to the longitudinal axis so as to be elastically bendable inwards and/or outwards, and which form parts of a hollow cylinder in longitudinal direction thereof, with the hollow cylinder having an inner diameter, which substantially corresponds to an outer diameter of the screw cap, and an outer diameter which is smaller than a diameter of a bore of the barrel,
  wherein each of the clamping segments terminates in a beaded end which extends radially into the hollow cylinder for formation of a gripping claw, said beaded end having a wall thickness which is smaller than a difference between a radius of the barrel bore and an outer radius of the screw cap, and, in longitudinal direction of the gripper, a length which is smaller than a width of the undercut of the screw cap in longitudinal direction of the screw.

21. The combination of claim 20, and further comprising a securing sleeve which is movable over the at least one gripper up to an area of the clamping segments, said securing sleeve having an inner diameter, which corresponds to the outer diameter of the hollow cylinder, and an outer diameter, which is smaller than the barrel bore.

22. The combination of claim 20 wherein the at least one gripper has a tubular portion, said clamping segments being formed by a plurality of slits extending in axial direction from the grabbing end inwardly over part of an axial length of the tubular portion.

23. The combination of claim 20 wherein the tubular portion has a wall thickness which is reduced, except for an area of the beaded ends, in the region of the clamping segments through turning the tubular portion on the inside thereof with respect to the remaining portion of the tubular portion.

24. The combination of claim 20 wherein the gripper is formed with a circumferential bevel inside of the clamping segments in a transitional area between the wall thickness of the hollow cylinder and the beaded end.

25. The combination of claim 20 wherein the screw extruder is a twin screw extruder having two screws, and further comprising a second one of said gripper, said two grippers arranged in side-by-side parallel disposition at a distance which corresponds to a distance of the two screws, and braced together by a connecting member for retaining their alignment.

26. The combination of claim 25 wherein the connecting member includes two tie rods and a first yoke, said tie rods and said first yoke being joined together by bolting or welding.

27. The combination of claim 25, and further comprising two securing sleeves for the two grippers, with one of the securing sleeve interacting with one of the grippers and movable over the gripper up to an area of the clamping segments, and the other one of the securing sleeve interacting with the other one of the grippers and movable over the gripper up to an area of the clamping segments, said securing sleeves being formed each by a tubular portion and rigidly joined together by a second yoke.

28. The combination of claim 27 wherein the second yoke has throughholes for passage of the tie rods and is guided by the tie rods.

29. The combination of claim 27 wherein the first yoke is connected to an eyelet for attachment of the pull mechanism.

30. The combination of claim 29 wherein the first yoke has a central threaded bore, and further comprising a threaded rod received in the threaded bore and having a free end which is securely fixed to the eyelet, and another end which is adapted for rotating in the second yoke and restrained immobile in an axial direction relative to the second yoke.

31. The combination of claim 21 wherein the gripper is movable between a locking position in which the grippers seizes the screw and a disengaged position, said clamping segments being bent radially outwards when the gripper is in the disengaged position, with the gripper having, in an area of the beaded ends, an inner diameter which is slightly greater or slightly smaller than the outer diameter of the screw cap.

32. The combination of claim 20 wherein the gripper is made of metal.

33. The combination of claim 32 wherein the gripper is made of steel.

* * * * *

UNITED STATES PATENT AND TRADEMARK OFFICE
CERTIFICATE OF CORRECTION

PATENT NO.     : 6,463,643 B1
DATED          : October 15, 2002
INVENTOR(S)    : Michael Behling It is certified that error appears in the above-identified patent and that said Letters Patent is hereby corrected as shown below:

<u>Title page,</u>
Item [75], Inventor, Michael Behling's address, replace "Hamein" with -- Hameln --.

Signed and Sealed this

Twenty-ninth Day of July, 2003

JAMES E. ROGAN
*Director of the United States Patent and Trademark Office*